(12) United States Patent
Khan et al.

(10) Patent No.: US 7,843,664 B2
(45) Date of Patent: Nov. 30, 2010

(54) ELECTROSTATIC DISCHARGE APPARATUS FOR HUB AND SPINDLE ASSEMBLIES

(75) Inventors: Raquib Uddin Khan, Pleasanton, CA (US); Paco Flores, Felton, CA (US); Klaus Dieter Kloeppel, Watsonville, CA (US); Anthony Joseph Aiello, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1176 days.

(21) Appl. No.: 11/351,389

(22) Filed: Feb. 9, 2006

(65) Prior Publication Data
US 2007/0183089 A1 Aug. 9, 2007

(51) Int. Cl.
G11B 19/20 (2006.01)
G11B 33/14 (2006.01)
(52) U.S. Cl. ..................... 360/99.08; 310/90
(58) Field of Classification Search .......... 360/98.07, 360/99.04, 99.08, 99.09, 99.11; 310/90, 310/90.5, 67 R
See application file for complete search history.

(56) References Cited

U.S. PATENT DOCUMENTS

| | | | |
|---|---|---|---|
| 4,132,414 A | 1/1979 | Dinsdale |
| 5,328,270 A | 7/1994 | Crawford et al. |
| 5,347,189 A | 9/1994 | Chuta et al. |
| 5,423,612 A | 6/1995 | Zang et al. |
| 5,427,456 A | 6/1995 | Hensel |
| 5,448,120 A | 9/1995 | Schaule et al. |
| 5,487,608 A | 1/1996 | Leuthold et al. |
| 5,516,212 A | 5/1996 | Titcomb |
| 5,524,986 A | 6/1996 | Leuthold et al. |
| 5,533,812 A | 7/1996 | Leuthold et al. |
| 5,577,842 A | 11/1996 | Parsoneault et al. |
| 5,601,125 A | 2/1997 | Parsoneault et al. |
| 5,653,540 A | 8/1997 | Heine et al. |
| 5,678,929 A | 10/1997 | Parsoneault et al. |
| 5,685,647 A | 11/1997 | Leuthold et al. |
| 5,716,141 A | 2/1998 | Chen |
| 5,793,129 A | 8/1998 | Parsoneault et al. |
| 5,847,479 A | 12/1998 | Wang et al. |
| 5,908,247 A | 6/1999 | Leuthold et al. |
| 5,925,955 A | 7/1999 | Norris |
| 5,940,246 A | 8/1999 | Khan et al. |
| 5,956,204 A | 9/1999 | Dunfield et al. |
| 5,969,903 A | 10/1999 | Parsoneault et al. |
| 5,977,674 A | 11/1999 | Leuthold et al. |
| 5,980,113 A | 11/1999 | Grantz |
| 6,019,516 A | 2/2000 | Leuthold et al. |
| 6,055,126 A | 4/2000 | Kennedy et al. |
| 6,065,877 A | 5/2000 | Leuthold et al. |
| 6,118,620 A | 9/2000 | Grantz et al. |
| 6,137,650 A | 10/2000 | Heine et al. |
| 6,144,523 A | 11/2000 | Murthy et al. |

(Continued)

Primary Examiner—Craig A. Renner

(57) ABSTRACT

An electrostatic discharge apparatus for use with a hub and spindle assembly for a disc drive storage system comprising a spindle; a hub rotatably mounted on the spindle; a capsule formed at least in part from an electrically conductive material that can be placed in electrical communication with the hub and defining a chamber configured to hold an electrically conductive fluid and defining at least one capillary channel in fluid communication with an opening formed in the capsule, the opening configured to permit rotation about the spindle, and to permit a meniscus formed by the conductive fluid proximate to the opening to electrically contact the spindle during rotation of the hub about the spindle.

22 Claims, 8 Drawing Sheets

U.S. PATENT DOCUMENTS

| | | |
|---|---|---|
| 6,148,501 A | 11/2000 | Grantz et al. |
| 6,149,159 A | 11/2000 | Kloeppel et al. |
| 6,149,161 A | 11/2000 | Grantz et al. |
| 6,183,135 B1 | 2/2001 | Kloeppel et al. |
| 6,280,088 B1 | 8/2001 | Leuthold et al. |
| 6,285,527 B1 | 9/2001 | Kennedy et al. |
| 6,296,390 B1 | 10/2001 | Wolff et al. |
| 6,296,391 B1 | 10/2001 | Hayakawa et al. |
| 6,402,383 B1 | 6/2002 | Parsoneault et al. |
| 6,575,634 B2 | 6/2003 | Nottingham |
| 6,583,952 B1 | 6/2003 | Grantz et al. |
| 6,594,883 B2 | 7/2003 | Kloeppel et al. |
| 6,982,510 B1 | 1/2006 | Aiello et al. |
| 2004/0042695 A1* | 3/2004 | Shishido et al. ............. 384/107 |
| 2004/0208404 A1 | 10/2004 | Dittmer et al. |
| 2006/0255672 A1* | 11/2006 | Flores et al. ................. 310/90 |

* cited by examiner

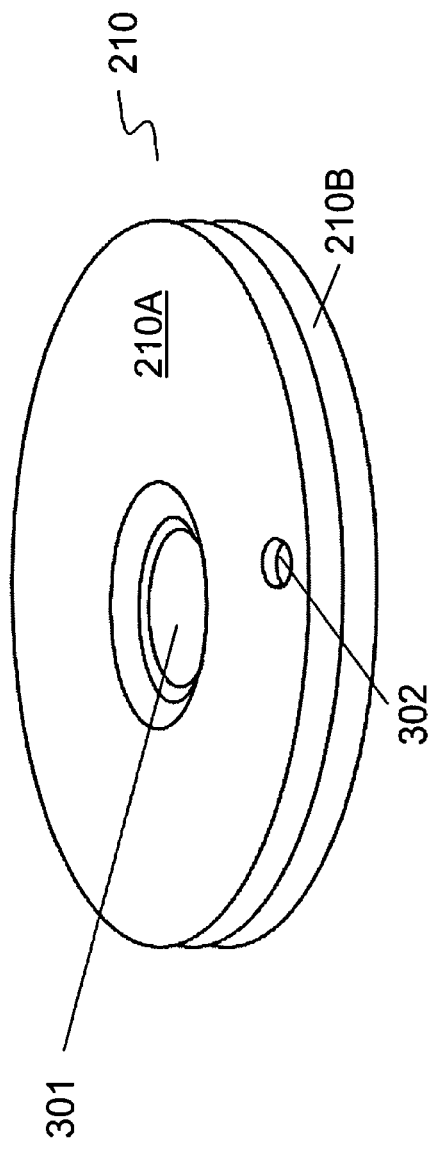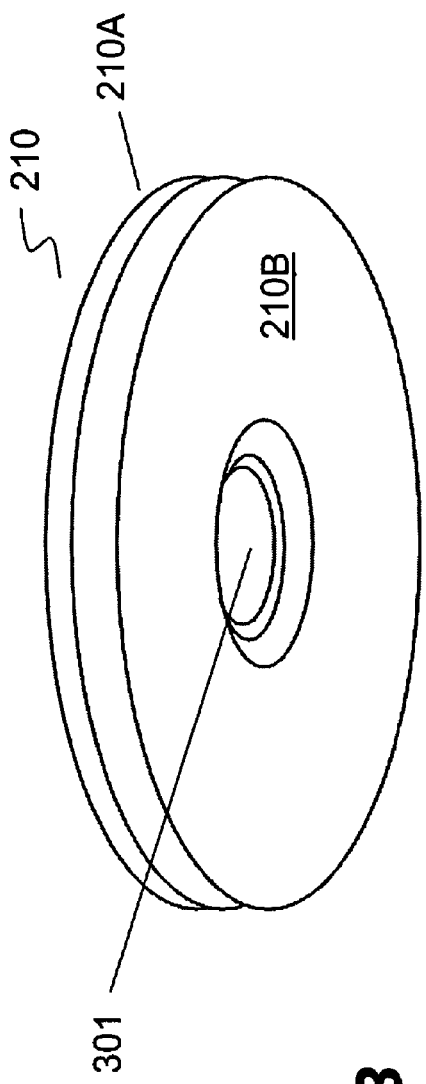

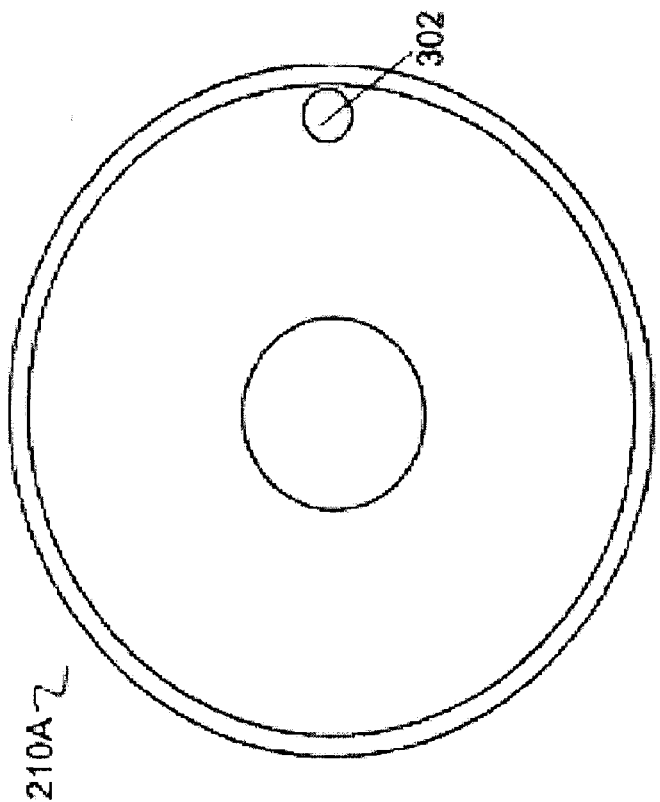
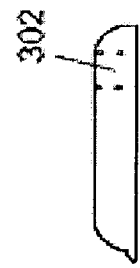
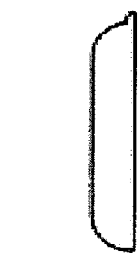
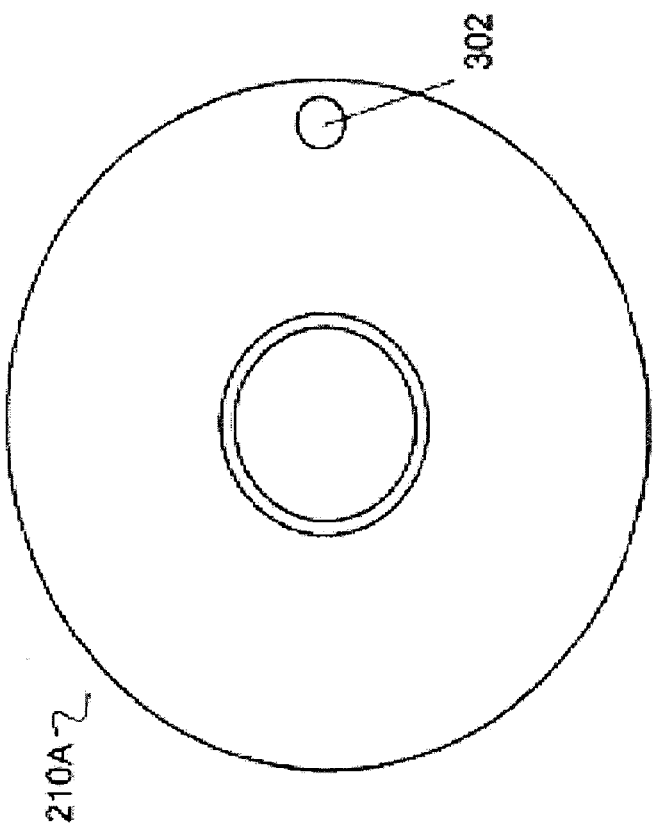
FIG. 5B
FIG. 5C
FIG. 5A

ELECTROSTATIC DISCHARGE APPARATUS FOR HUB AND SPINDLE ASSEMBLIES

TECHNICAL FIELD

The present invention relates generally to hub and spindle for disk drive memory storage devices, and more particularly to an electrostatic discharge apparatus providing for electrical charge transfer between static and moving parts for such hub and spindle assemblies.

BACKGROUND ART

Disc drive memory systems have been used in computers for many years for storage of digital information. Information is recorded on concentric memory tracks of a magnetic disc medium, the actual information being stored in the form of magnetic transitions within the medium. The discs themselves are mounted on a hub that is rotatably mounted on a fixed spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub that supports the discs. One type of motor in common use is known as an in-hub or in-spindle motor. Such in-spindle motors typically have a spindle mounted by means of ball or fluid dynamic bearing systems to a fixed motor shaft (spindle) disposed in the center of the hub. Generally, such motors include a stator formed in a base of the assembly, comprising a plurality of teeth arranged in a circle. Each of the teeth support coils or windings that may be sequentially energized to polarize the stator. A plurality of permanent magnets are disposed in alternating polarity on an inside rim of the hub, adjacent the stators. As the coils disposed on the stators are sequentially energized in alternating polarity, the magnetic attraction and repulsion of each stator to the adjacent magnets cause the hub to rotate, thereby rotating the disc and passing the information storage tracks across the head.

Motors used in disc storage systems can use hub and spindle assemblies having ball bearings, and/or fluid dynamic bearings. For both types of bearings, a lubricating fluid can be in a liquid or gaseous state. The use of fluid dynamic bearing assemblies in such drive systems has become preferred due to desirable reductions in drive size and noise generation as compared to conventional ball bearing drive systems. In fluid dynamic bearings, a lubricating fluid functions as the bearing surface between a spindle and a hub. Such bearings are of the journal and thrust types. Journal bearings fix the radial position of a hub as it rotates around a spindle. Thrust bearings constrain the axial position of the hub as it rotates.

As the demand for higher performance from drive systems increases, in terms of more revolutions per minute for a spinning disc, as well as lower power consumption for drive motors, the use of lower viscosity lubricating fluids and/or gasses in bearings becomes attractive to further reduce friction and rotational drag. It is well known that thin film head and disc interfaces are highly sensitive to damage from electrostatic discharge that can result from triboelectric charge build-up. Thus it is desirable for a conductive path to be established between a thin film head and a disc surface to prevent such charge build-up. For ball bearing based disk storage systems, the charge can get transferred either through the ball-raceway interface of the bearing or a ferrofluidic seal of the spindle motor. For fluid dynamic bearings where the fluid is a liquid, electrical charge can get transferred from the head-disc interface to the ground through the spindle motor fluid dynamic bearing, if the bearing gap is reasonably small. However if a the fluid is a gas, such charge transfer can be substantially blocked. Therefore, it is desirable to establish another conductive path between spindle and hub. Ferrofluid seals, wherein a ferrofluid containing metallic particle is positionally constrained by magnetic forces can be used, however such ferrofluids tend to outgas and otherwise contaminate a disc drive, degrading reliability. It is desirable to provide a conductive seal for a bearing assembly for a disc storage system that can prevent electrical charge buildup between the thin film head and the disc, that has a long operational life but does not suffer from the contamination and magnetic field confinement requirements of ferrofluidic seals.

SUMMARY OF THE INVENTION

An embodiment of the invention is an electrostatic discharge apparatus for use with a hub and spindle bearing assembly for a disc drive storage system comprising: a capsule formed at least in part from an electrically conductive material that can be placed in electrical communication with the hub and defining a chamber configured to hold an electrically conductive fluid and defining at least one capillary channel in fluid communication with a first opening formed in the capsule, the first opening configured to permit rotation about the spindle, and to permit a meniscus formed by the conductive fluid proximate to the opening to electrically contact the spindle during rotation of the hub about the spindle. In a further embodiment, the capsule, further comprises a second opening in the capsule configured to fill the chamber with the electrically conductive fluid.

In some embodiments, the at least one capillary channel can radially configured, while in other embodiments, the at least one capillary channel can be configured as a spiral. In either of these two types of embodiments, the at least one capillary channel can be configured to narrow toward the first opening, and the at least one capillary channel can contain a conductive fluid, for example an electrically non-conductive lubricant and an electrically conductive, non-metallic, non-magnetic additive.

In some embodiments the capsule can be configured as at least a partial annulus having an open center, wherein the first opening defines the open center of the at least a partial annulus. In further embodiments, at least of portion of the capsule can be integrated with the hub.

For another embodiment of the invention, a disc drive storage system can comprise: a spindle; a hub rotatably mounted on the spindle; and a capsule formed at least in part from an electrically conductive material that can be placed in electrical communication with the hub and defining a chamber configured to hold an electrically conductive fluid and defining at least one capillary channel in fluid communication with a first opening formed in the capsule, the first opening configured to permit rotation about the spindle, and to permit a meniscus formed by the conductive fluid proximate to the opening to electrically contact the spindle during rotation of the hub about the spindle. The capsule can have additional features as discussed in connection with the above embodiments.

A further embodiment of the invention is a method of preventing build up of electrostatic charge within an a disc drive storage system that includes a spindle and hub bearing assembly, the method comprising: electrically contacting a meniscus in fluid communication with a conductive fluid contained within a capillary channel defined within a capsule, formed at least in part of an electrically conductive material, wherein the capsule is in electrical contact with the hub. In a yet further embodiment, the capsule can electrically contact the hub, and the meniscus can electrically contact the spindle as the spindle while the hub rotates about the spindle. In addition embodiments, conductive fluid comprises an electrically non-conductive lubricant and an electrically conductive, non-metallic, non-magnetic additive.

BRIEF DESCRIPTION OF THE DRAWINGS

For a fuller understanding of aspects and examples disclosed herein, reference is made to the accompanying drawings in the following description.

FIGS. 3A and 3B show top and bottom perspective views of a conductive capillary seal according to an embodiment of the invention.

FIGS. 5A and 5B show top and bottom views, respectively, of a second member of a conductive capillary seal according to an embodiment of the invention. FIG. 5C is a cross-sectional view of the second member.

DETAILED DESCRIPTION OF THE INVENTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

Figure 1:
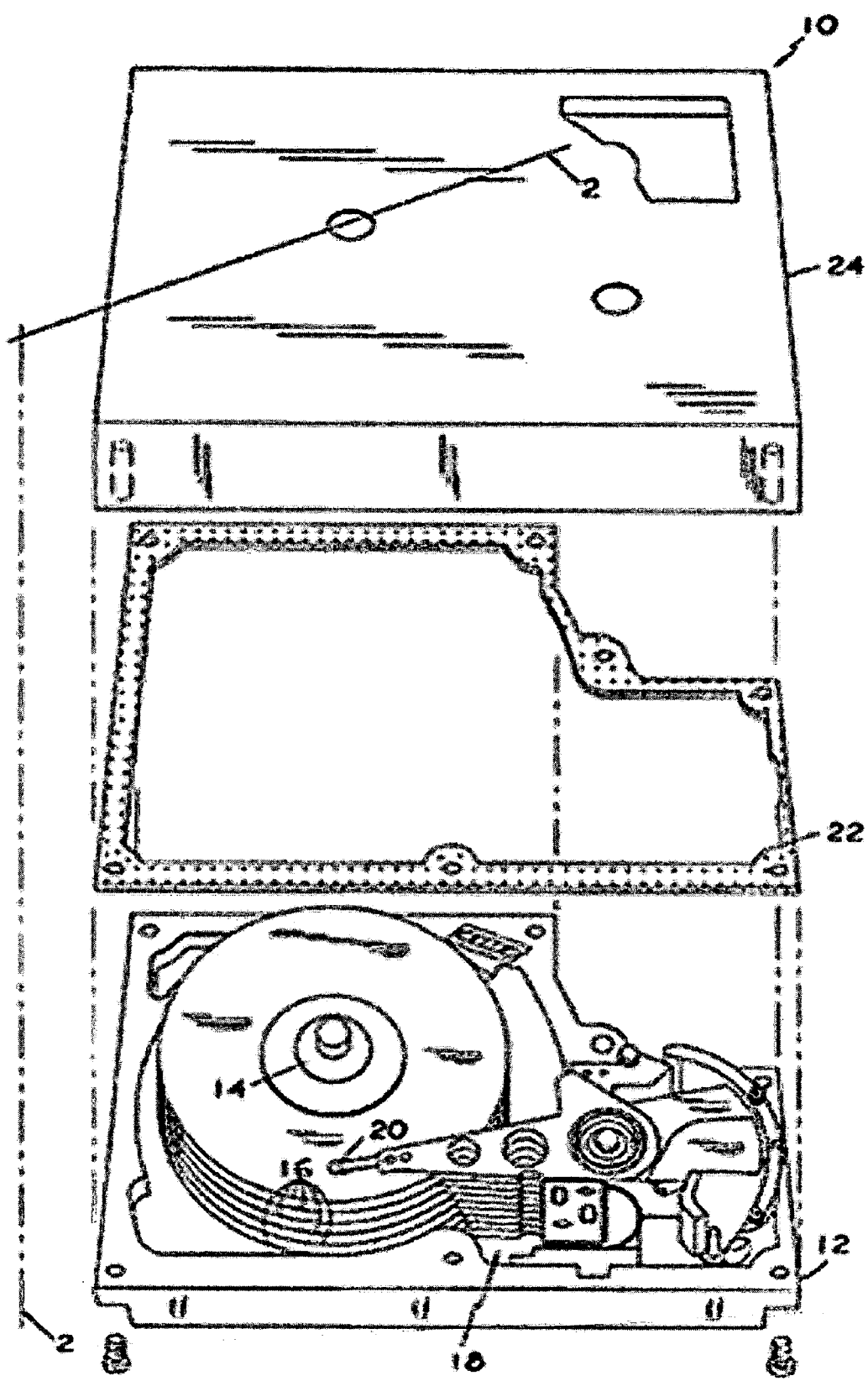
FIG. 1 illustrates a plan view of an exemplary disc drive.

Turning briefly to FIG. 1, a plan view of an exemplary magnetic disc drive storage system is illustrated. In this example, the storage system 10 includes a housing base 12 having spindle motor 14 which rotatably carries storage discs 16. An armature assembly 18 moves transducers 20 across the surface of the discs 16. The environment in which discs 16 rotate may be sealed by seal 22 and cover 24. In operation, discs 16 rotate at high speed while transducers 20 are positioned at any one of a radially differentiated track on the surface of the discs 16. This allows transducers 20 to read and write magnetically encoded information on the surfaces of discs 16 at selected locations. Discs 16 may rotate at many thousand RPM.

To provide for rotation of discs 16, spindle motor 14 typically includes at least one rotatable portion. The at least one rotatable portion in turn typically interfaces with one or more non-rotating surfaces, that may form journal and/or thrust hydrodynamic bearings. Hydrodynamic bearings often incorporate liquid lubricants, such as oil between the rotatable portion(s) and fixed portion(s) of spindle motor 14. Capillary seals help confine liquid lubricant to areas intended for lubrication and also provide a reservoir of liquid lubricant that compensates for losses due to evaporation, spillage and the like.

Capillary seals are often used to retain lubricating fluid (e.g., oil) at hydrodynamic bearing surfaces of disc drive motors and to provide a reservoir of lubricating liquid sufficient to maintain lubrication of hydrodynamic bearing surfaces throughout an expected lifetime of the disc drive.

Typical capillary seals are formed between radially opposing surfaces of coaxially disposed relatively rotating members of a disc drive motor, e.g., between an outer surface of a fixed shaft and an inner surface of a rotating hub disposed around the shaft. Typically, either the shaft or the hub is machined so that the radially opposing surfaces taper with respect to each other and thereby form a capillary seal with an annular type cross-section that tapers in cross-sectional area from a vent opening to the hydrodynamic bearing.

Such capillary seals often have a relatively large cross-sectional area exposed to an ambient environment, and thus may be prone to losing fluid due to operational shock and/or evaporation. Accordingly, capillary seals and reservoirs using capillary forces that may have benefits including a reduction in a cross-sectional area exposed to an ambient environment and an increase in shock resistance of the seals and reservoirs are desired.

U.S. application Ser. No. 11/126,932, filed May 10, 2005, and entitled COLUMN CAPILLARY SEAL FOR FDB MOTORS, discusses column capillary seals and is hereby incorporated herein in its entirety by reference.

Figure 2:
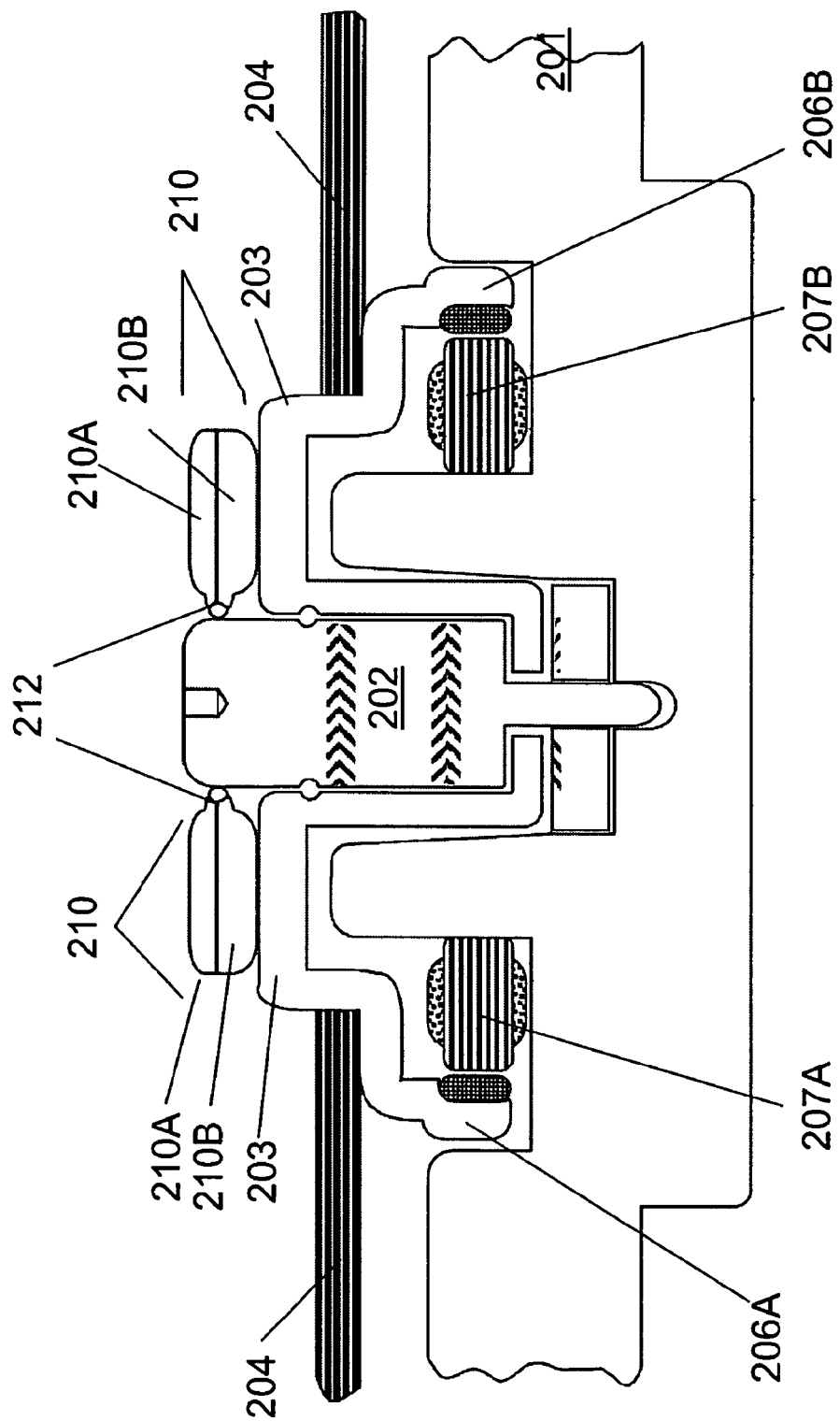
FIG. 2 illustrates a cross sectional view of a disc drive according to an embodiment of the invention.

FIG. 2 illustrates a cross-sectional diagram of a disc drive motor according to an embodiment of the invention. Hub 203 rotates about fixed spindle 202 that is mounted to base 201. Disc 204 is coupled to hub 203, as is annular conductive capillary seal assembly shown as capsule 210. Permanent magnets 206A and 206B are coupled to an inner rim of hub 203, as shown, and cause hub 203 to rotate responsive to alternating magnetic fields from stator magnets 207A and 207B that are coupled to base 201. According to some embodiments, thrust and journal bearing surface interfaces between hub 203 and spindle 202 are lubricated by a fluid (liquid and/or gas phase) that is pressurized by fluid dynamic bearings (FDBs). If a gas phase fluid is used, spindle 202 and hub 203 can be substantially electrically isolated due to a lower electrical conductivity of the gas phase fluid compared with a liquid phase fluid, leading to a differential charge build-up on spindle 202 and hub 203. Such a charge build-up can lead to electrostatic discharge (ESD) between a read/write thin-film head (not shown) and a proximate surface of disc 204. Such ESD can damage the read/write thin-film head and/or the proximate surface of disc 204. In order to prevent such charge buildup, annular conductive capillary seal 210 is provided according to an embodiment of the invention. Annular conductive capillary seal 210 is comprised of coupled first and second members 210B and 210A, respectively. First member 210B is electrically and mechanically coupled to hub 203. A meniscus of conductive fluid 212 from an inner, annular perimeter of annular conductive capillary seal 210, is in fluid and electrical contact with proximate surfaces of spindle 202. Because disc 204 is mechanically and electrically coupled to hub 203; and because spindle 202 is mechanically and electrically coupled to base 201, which can be electrically coupled to the read/write, thin-film head, charge build-up between a surface of disc 204 and a read/write thin-film head can be reduced.

FIGS. 3A and 3B provide top and bottom perspective views, respectively, of annular conductive capillary seal, respectively. Central annular hole 301 passes through the seal assembly, and is defined by an inner annular surface of the annular conductive capillary seal. A meniscus of conductive fluid can form on the inner annular surface. Hole 302 is in the second member 210A of the annular conductive capillary seal 210, and is used to fill the seal with conductive fluid.

Figure 4B:
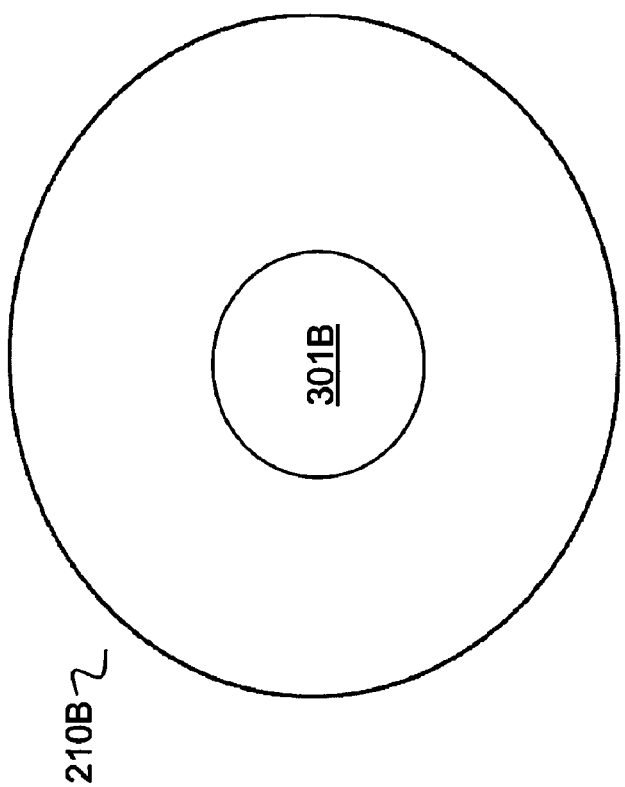
FIGS. 4A and 4B show top and bottom views, respectively, of a first member of a conductive capillary seal according to an embodiment of the invention.
Figure 4C:
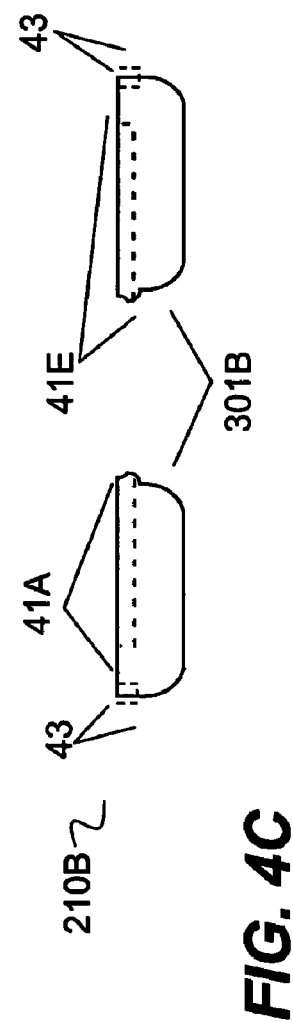
FIG. 4C is a cross-sectional view of the first member.
Figure 4A:
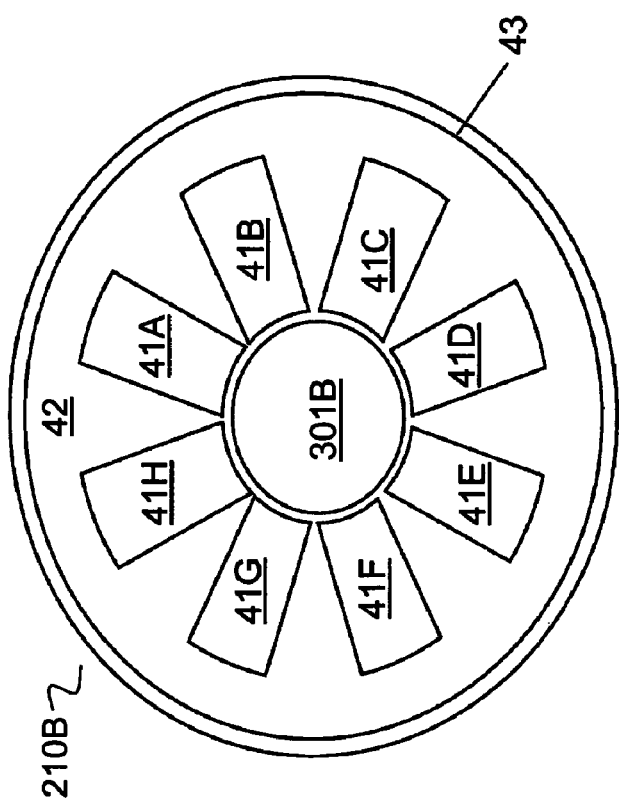

Referring now to FIG. 4, FIG. 4A shows a top view of first member 210B, FIG. 4B illustrates a bottom view of first member 210B, and FIG. 4C illustrates a cross-sectional view of first member 210B. 301B is the central, annular hole portion of first member 210B. Outer perimeter lip 43 partly defines an internal cavity 42 to contain conductive fluid. Raised sections 41A through 41H define a radial sequence of capillary channels in internal cavity 42 that taper to central annular hole 301B, to provide a supply of conductive fluid. In some embodiments, the tops of raised sections 41A through 41H are coplanar with outer perimeter lip 43. First member 210B can be made of any mechanically acceptable material with adequate electrical conductivity, that is also compatible with a conductive fluid to be used. For example, first member 210B can be made of metal, metal alloys, conductive polymers, or conductive composite materials as are well known to one of ordinary skill in the art. Outer perimeter lip 43 and raised sections 41A through 41H can be formed in the upper surface of first member 210B using a variety of techniques that are well known to one of ordinary skill in the art, for example without exclusion: (i) machining; (ii) stamping; (iii) chemical etching; (iv) molding; (v) electrodeposition; and (vi) various laser or mechanical ablation techniques. Although eight raised sections 41 have been shown in FIG. 4A to define 8 capillary channels in cavity 42, other number of raised sections can also be used in other embodiments of the invention. In further embodiments, as discussed below, non-radial geometries for the capillary channels may also be used. Although first and second members 210B and 210A have been illustrated for a capsule 210 in full annular configuration, other embodiments include angularly constrained, partial annular configurations, as long as at least one capillary channel is contained therein. In some embodiments, the angularly constrained annulus segment can more resemble a "wiper" configuration, providing a meniscus contact with an angularly restricted region of the spindle at any given time.

FIG. 5 illustrates various aspects of second member 210A according to aspects of the embodiments. FIG. 5A shows a top view, FIG. 5B shows a bottom view, and FIG. 5C shows a cross-sectional view. The surface of FIG. 5B, that mates with the top of first member 210B is substantially planar, such that outer perimeter lip 43 and raised sections 41A through 41H of first member 210B form substantially fluid-tight seals with the bottom surface of second member 210a. Filling hole 302 extends through second member 210A and can used for fluid access to cavity 42 of first member 210B, when assembled with second member 210A.

First member 210B can be coupled to second member 210A using a variety of techniques well known to one of ordinary skill in the art, for example without exclusion: (i) welding; (ii) adhesives; (iii) soldering; (iv) press fitting with appropriate mechanical modifications; (v) and rivets, screws, self-tapping screws, or nuts and bolts with appropriate flange and hole modifications. Likewise, first member 210B can be coupled to second member 210A using an external clamp. Annular conductive capillary seal 201 can be similarly coupled to hub 203 using a variety of similar techniques that are well known to one of ordinary skill in the art.

Figure 6:
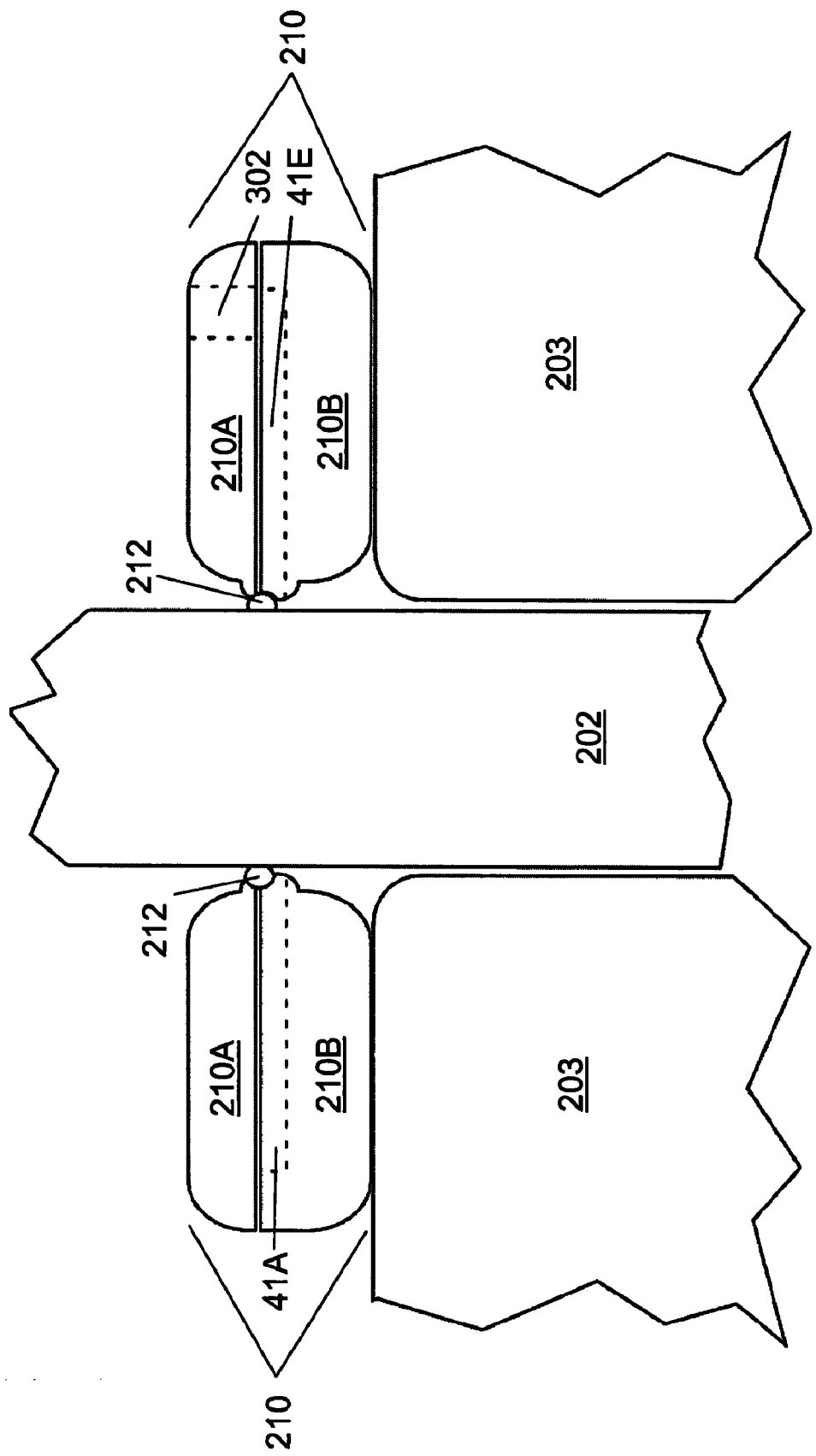
FIG. 6 is detailed cross-sectional view of an embodiment of the invention.

FIG. 6 illustrates a close-up detail of the embodiment shown in FIG. 2. In some embodiments, the perimeter of the inner annular hole of annular conductive capillary seal 210 that provides meniscus 212 can be configured as an axially narrowed section to help confine the axial extent of meniscus 212's contact with spindle 202. The can reduce the dissipation of the conducting fluid that forms the meniscus and also reduce contamination of the bearing assembly by the fluid.

Figure 7:
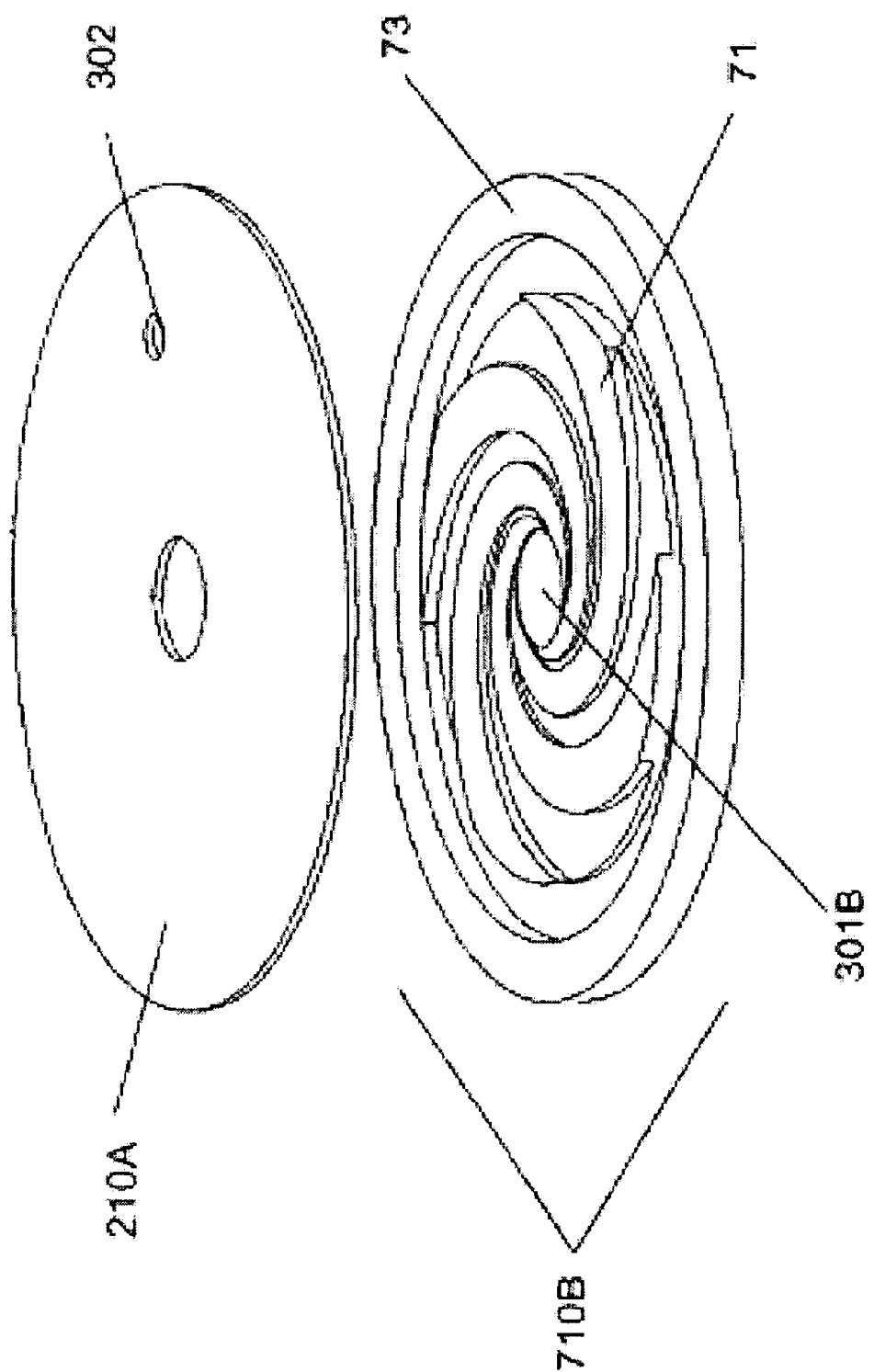
FIG. 7 is an exploded view of a conductive capillary seal according to a further embodiment of the invention.
Figure 8:
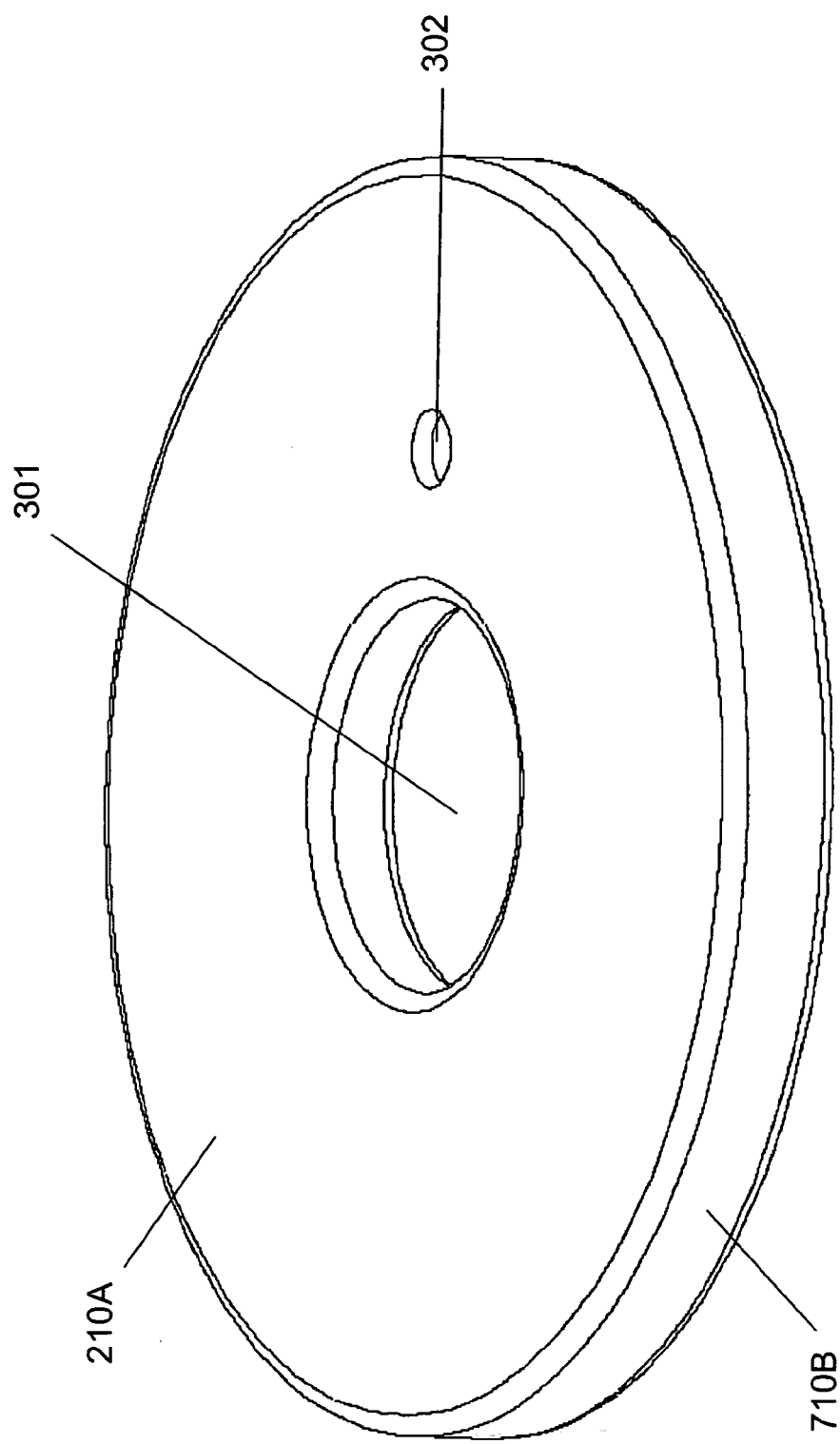
FIG. 8 is a perspective, assembled view of the embodiment of FIG. 7.

FIG. 7 illustrates a further embodiment of the annular conductive capillary seal second member 210A is as described above in connection with previous embodiments. First member 710B has a outer perimeter lip 73 and a central annular hole 301B, as described above in connection with other embodiments. However raised sections 71 are formed in spiral patterns to produce spirally shaped capillary channels. An advantage of this embodiment is that longer, spirally shaped capillary channels can be formed in the same diameter annular conductive capillary seal assembly, than can radially shaped capillary channels. This can provide for longer conductive fluid supply lifetimes, at lower conductive fluid supply rates. Although four spirally shaped capillary channels are illustrated in FIG. 7, in other embodiments, the first member 710B can have other numbers of spirally shaped capillary channels.

According to an embodiment of the present invention, the conductive fluid comprises an electrically non-conductive lubricant and an electrically conductive, non-metallic, non-magnetic additive which improves electrical conductivity of the lubricant without sacrificing desirable lubricating properties such as viscosity, anti-oxidation, anti-corrosion and anti-wear performance. Preferred base lubricants include a mineral based hydrocarbon, a synthetic hydrocarbon, an ester or a combination of base lubricants. Mineral based hydrocarbons are preferably highly refined (highly purified).

Preferred additives include organic polymers, such as a commercially available solution of a quarternized polymeric aminoamide ester, a nitrilo polymer, chlorobenzene and ethylene dichloride in aromatic and aliphatic hydrocarbons. The aromatic and aliphatic hydrocarbons have a 40-70% concentration as compared to the remaining elements of the additive solution. One example of such a commercially available solution is Tolad 511 from Petrolite Corporation, U.S.A. Another example of a suitable commercially available organic polymer includes a solution of a solvent (toluene, isopropyl alcohol, and other aromatic solvents C9-C16), dodecyl, benzene and sulfonic acid. Other commercially available solutions can also be used. Since the additives are non-metallic and non-magnetic, the additives do not adversely effect wear and viscosity performance. Other non-metallic additive solutions can also be used.

The concentration of the additive in the lubricant can be varied to achieve a desired conductivity. However, the concentration is preferably kept low such that the overall viscosity of the lubricant is not changed. In a preferred embodiment, the concentration of the additive is 100-5000 ppm in the lubricant, and the treated lubricant has a resistance of less than 50 M.OMEGA. For example, 1000 ppm (i.e. 0.1%) of an organic polymer in a mineral based hydrocarbon has been found to give suitable performance. This is a much lower concentration than a typical ferrofluid lubricant in which the ferromagnetic particles have a concentration in the lubricant of up to 4%.

Additional examples are discussed in U.S. Pat. No. 5,940,246, DISC DRIVE HYDRO BEARING LUBRICANT WITH ELECTRICALLY CONDUCTIVE NON-METALLIC ADDITIVE (Aug. 17, 1999) which is hereby incorporated by reference in its entirety.

The conductive fluid of the present invention therefore provides an electrically conductive path for discharging electrostatic charge from the disc surface while providing greatly improved wear performance over conductive lubricants that include metallic or magnetic additives.

In alternative embodiments, the lubricant can include numerous other blends or additives for improving performance factors such as oxidation, corrosion, wear and viscosity, as discussed in greater detail in U.S. application Ser. No. 08/737,431, entitled "Disc Drive Spindle Motor Having Hydro Bearing With Optimized Lubricant Viscosity," U.S. application Ser. No. 08/737,438, entitled "Miniature Disc Drive Spindle Motor Having Hydro Bearing With High Shear-Strength Viscosity Index Improved Lubricant," and U.S. application Ser. No. 08/737,439, entitled "Disc Drive Spindle Motor Having Hydro Bearing With Lubricant Optimized With Disc Drive Compatible Additives," which were filed on Oct. 25, 1996, claim priority from U.S. Provisional application Ser. No. 60/008,124 and are hereby incorporated by reference.

Although the present invention has been described with reference to preferred embodiments, workers skilled in the art will recognize that changes may be made in form and detail without departing from the spirit and scope of the invention. The specific structures, lubricants, and additives provided herein are examples only. Other base lubricants and non-metallic or nonmagnetic conductivity enhancing additives can also be used in accordance with the present invention.

Also, although the conductive capillary seal has been described as having an annular configuration that is mechanically and electrically coupled to a hub, and in fluid and electrical communication with a spindle, alternatively, a radially configured conductive capillary seal can be mechanically and electrically coupled to a spindle, and in fluid and electrical communication with a hub. A potential drawback of the latter embodiment is reduced seal assembly area, possibly resulting in reduced conductive fluid storage capacity. A potential advantage of the latter embodiment is that the conductive fluid stored in the capillary channels would not be subjected to centrifugal forces by the rotating hub.

Various motor and capillary seal aspects have been illustrated and described herein. In some figures, rotating shaft designs have been presented while in others, fixed shaft designs have been presented. One of ordinary skill in the art would understand that teachings related to each may be adapted to the other design. Also, it would be understood that certain components have been separately identified herein, but such identification does not imply that such components must be separately formed from other components. Similarly, components identified herein may be subdivided into sub-components in other designs. Additionally, features such as recirculation channels, bearing surfaces, pumping grooves, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve the disadvantages.

To the extent that publications and patents or patent applications incorporated herein by reference contradict the disclosure contain in this specification, this specification is intended to supersede and/or take precedence over any such contradictory material.

The invention claimed is:

1. An electrostatic discharge apparatus for use with a hub and spindle bearing assembly comprising:
a capsule formed at least in part from an electrically conductive material configured to be placed in electrical communication with the hub and defining a chamber configured to hold an electrically conductive fluid and defining at least one capillary channel in fluid communication with a first opening formed in the capsule, the first opening configured to permit rotation about the spindle, and to permit a meniscus formed by the conductive fluid proximate to the opening to electrically contact the spindle during rotation of the hub about the spindle.

2. The apparatus of claim 1, further comprising a second opening in the capsule configured to fill the chamber with the electrically conductive fluid.

3. The apparatus of claim 1, wherein the at least one capillary channel is radially configured.

4. The apparatus of claim 1, wherein the at least one capillary channel is configured as a spiral.

5. The apparatus of claim 1, wherein the at least one capillary channel is configured to narrow toward the first opening.

6. The apparatus of claim 1, wherein the at least one capillary channel contains a conductive fluid.

7. The apparatus of claim 6, wherein the conductive fluid comprises an electrically non-conductive lubricant and an electrically conductive, non-metallic, non-magnetic additive.

8. A disc drive storage system comprising:
a spindle;
a hub rotatably mounted on the spindle;
a capsule formed at least in part from an electrically conductive material configured to be placed in electrical communication with the hub and defining a chamber configured to hold an electrically conductive fluid and defining at least one capillary channel in fluid communication with a first opening formed in the capsule, the first opening configured to permit rotation about the spindle, and to permit a meniscus formed by the conductive fluid proximate to the first opening to electrically contact the spindle during rotation of the hub about the spindle.

9. The system of claim 8, further comprising a second opening in the capsule configured to fill the chamber with the electrically conductive fluid.

10. The system of claim 8, wherein the at least one capillary channel is radially configured.

11. The system of claim 8, wherein the at least one capillary channel is configured as a spiral.

12. The system of claim 8, wherein the at least one capillary channel is configured to narrow toward the first opening.

13. The system of claim 8, wherein the at least one capillary channel contains a conductive fluid.

14. The system of claim 13, wherein the conductive fluid comprises an electrically non-conductive lubricant and an electrically conductive, non-metallic, non-magnetic additive.

15. An electrostatic discharge apparatus for use with a hub and spindle assembly comprising:
  a stationary spindle;
  a hub rotatably mounted on the spindle;
  an annular chamber coupled to the hub and containing an electrically conductive fluid;
  the annular chamber having: an open center receiving the stationary spindle, a first opening out of the annular chamber adjacent the open center in fluid communication with contact points between the annular chamber and the spindle; and a capillary channel contained within the annular chamber in communication with the first opening.

16. The electrostatic discharge apparatus of claim 15 wherein the annular chamber includes a second opening into the annular chamber for receiving the electrically conductive fluid.

17. The electrostatic discharge apparatus of claim 15 wherein the capillary channel is radially configured.

18. The electrostatic discharge apparatus of claim 15 wherein the capillary channel extends across the width of the annular chamber.

19. The electrostatic discharge apparatus of claim 15 wherein the capillary channel provides a flow path for the electrically conductive fluid to the first opening.

20. The electrostatic discharge apparatus of claim 15 wherein the capillary channel narrows toward the first opening.

21. The electrostatic discharge apparatus of claim 15 wherein the annular chamber is made of an electrically conductive material.

22. The electrostatic discharge apparatus of claim 15 wherein the conductive fluid comprises an electrically non-conductive lubricant and an electrically conductive, non-metallic, non-magnetic additive.

* * * * *